United States Patent
Xu et al.

(10) Patent No.: US 9,059,921 B2
(45) Date of Patent: *Jun. 16, 2015

(54) METHOD, NETWORK, AND COMPUTER PRODUCT FOR FLOW BASED QUALITY OF SERVICE

(71) Applicant: AT&T Intellectual Property, I., L.P., Atlanta, GA (US)

(72) Inventors: Gang Xu, Piscataway, NJ (US); Xiao Pan, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/678,787

(22) Filed: Nov. 16, 2012

(65) Prior Publication Data
US 2013/0070599 A1   Mar. 21, 2013

Related U.S. Application Data

(63) Continuation of application No. 12/814,987, filed on Jun. 14, 2010, now Pat. No. 8,369,238.

(51) Int. Cl.
| | |
|---|---|
| *H04L 12/24* | (2006.01) |
| *H04L 12/801* | (2013.01) |
| *H04L 12/851* | (2013.01) |
| *H04L 12/813* | (2013.01) |

(52) U.S. Cl.
CPC ............ *H04L 47/12* (2013.01); *H04L 41/5022* (2013.01); *H04L 41/5067* (2013.01); *H04L 47/20* (2013.01); *H04L 47/2433* (2013.01)

(58) Field of Classification Search
CPC . H04L 41/5022; H04L 41/5067; H04L 47/12; H04L 47/2433
See application file for complete search history.

(56) References Cited

U.S. PATENT DOCUMENTS

| | | | |
|---|---|---|---|
| 7,710,989 | B2 | 5/2010 | Chew |
| 2004/0179515 | A1 | 9/2004 | Kamani et al. |
| 2006/0045128 | A1 | 3/2006 | Madour |
| 2009/0119396 | A1 | 5/2009 | Kanda |

OTHER PUBLICATIONS

Alcatel-Lucent, "Next-generation Layer 3 Multicast VPN (MVPN) Services"; Copyright 2010 Alcatel-Lucent; pp. 1-24; retrieved from www.alcatel-lucent.com.
Wikipedia, "Quality of Service"; retrieved from http://en.wikipedoa.org/wiki/Quality_of_service on May 26, 2010; pp. 1-11.

*Primary Examiner* — Jianye Wu
(74) *Attorney, Agent, or Firm* — Cantor Colburn LLP

(57) ABSTRACT

A method, network, and computer program product are provided for traffic flow quality of service. A quality of service priority table is received for services defined by a user at the network, and the quality of service priority table includes quality of service levels for the services. Traffic flows are determined to correspond to packets being communicated over the network for the user. The traffic flows are mapped to services. The traffic flows are mapped to the quality of service levels for the services. The quality of service levels are assigned to the traffic flows as assigned quality of service levels corresponding to the services. Each of the traffic flows is routed over the network according to its assigned quality of service levels, respectively.

20 Claims, 5 Drawing Sheets

FIG. 2

Priority Table 110

| Services (software applications) | Quality of Service |
|---|---|
| P2P Communication (Skype™) | High |
| P2P TV | Medium |
| Web (Internet Explorer®) | Low |
| Email (Outlook®) | Low |

FIG. 3

Priority Table 110

| Services (software applications) | Quality of Service |
|---|---|
| Office Applications (business applications) | High |
| Email | Medium |
| MySpace™ | Low |
| YouTube™ | Low |

FIG. 5

| Packet Information (1 or more of 5 tuples) | Traffic Flow (string of packets) | Services (software applications) | Quality of Service |
|---|---|---|---|
| IP header information, source/destination IP address, source/destination of port number, and IP protocol | A | P2P Communication (Skype™) | High |
| " " | B | P2P TV | Medium |
| " " | C | Web (Internet Explorer®) | Low |
| " " | D | Email (Outlook®) | Low |

Mapping Table 500

METHOD, NETWORK, AND COMPUTER PRODUCT FOR FLOW BASED QUALITY OF SERVICE

CROSS-REFERENCE TO RELATED APPLICATIONS AND PRIORITY CLAIM

This application is a continuation of U.S. Non-Provisional application Ser. No. 12/814,987, entitled "METHOD, NETWORK, AND COMPUTER PRODUCT FOR FLOW BASED QUALITY OF SERVICE", filed Jun. 14, 2010, which is incorporated herein by reference in its entirety.

BACKGROUND

Exemplary embodiments relate to quality of service, and more particularly to, quality of service for services defined by the user.

In the field of computer networking and other packet-switched telecommunication networks, the traffic engineering term quality of service (QoS) refers to resource reservation control mechanisms rather than the achieved service quality. Quality of service is the ability to provide a guarantee of a certain level of performance. For example, a required bit rate, delay, jitter, packet dropping probability and/or bit error rate may be guaranteed. Quality of service guarantees are important if the network capacity is insufficient, especially for real-time streaming multimedia applications such as voice over Internet protocol (IP), online games, and IP-TV, since these often require fixed bit rate and are delay sensitive, and in networks where the capacity is a limited resource, for example in cellular data communication.

BRIEF SUMMARY

Exemplary embodiments include a method for traffic flow quality of service. A quality of service priority table is received for services defined by a user at the network, and the quality of service priority table includes quality of service levels for the services. Traffic flows are determined to correspond to packets being communicated over the network for the user. The traffic flows are mapped to services. The traffic flows are mapped to the quality of service levels for the services. The quality of service levels are assigned to the traffic flows as assigned quality of service levels corresponding to the services. Each of the traffic flows is routed over the network according to its assigned quality of service levels, respectively.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 2 illustrates an example of a quality of service priority table in accordance with exemplary embodiments;

FIG. 3 illustrates an example of a quality of service priority table in accordance with exemplary embodiments;

FIG. 5 illustrates an example of a mapping table in accordance with exemplary embodiments.

Figure 1:
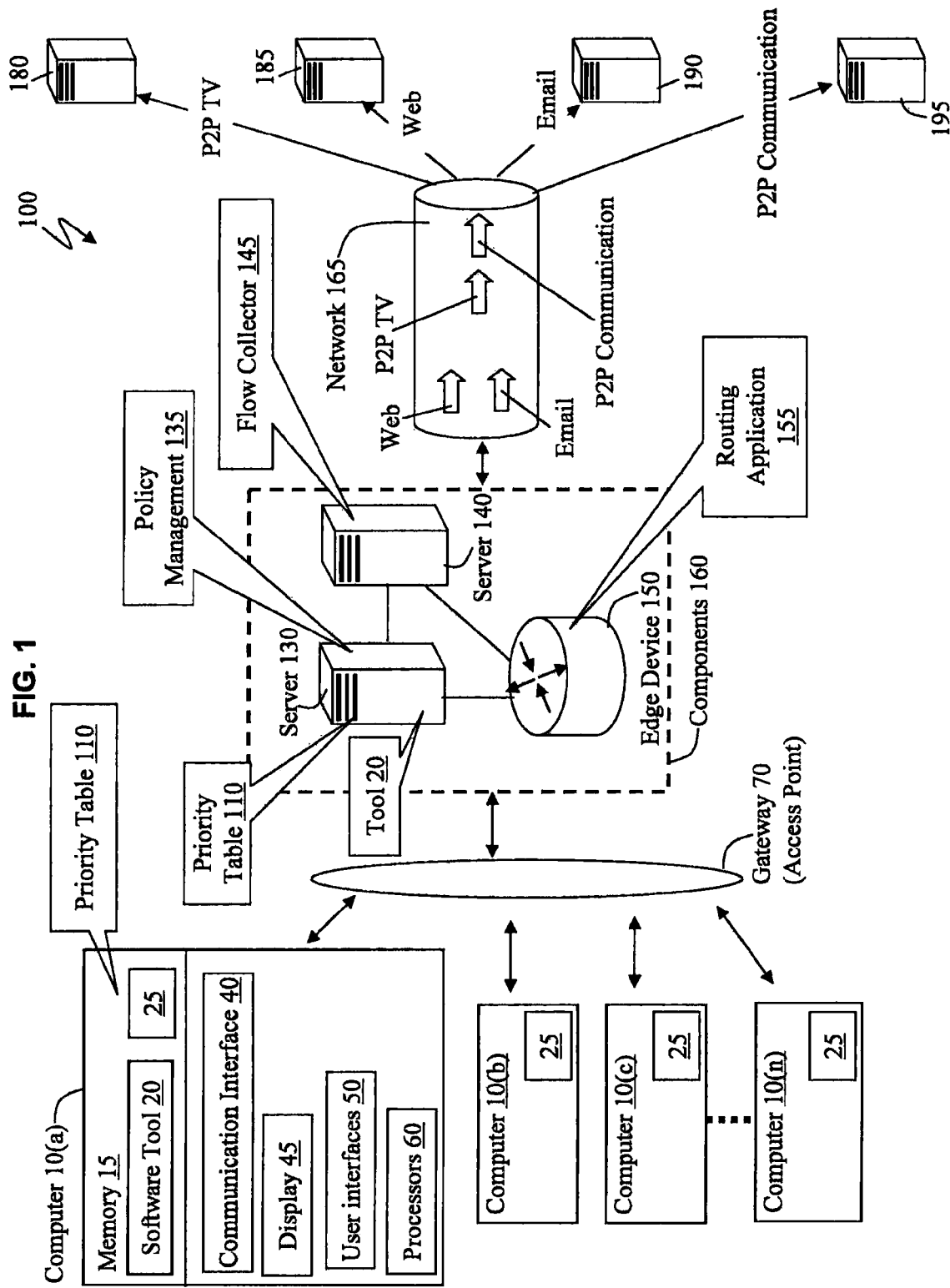
FIG. 1 illustrates a block diagram in accordance with exemplary embodiments.

The detailed description explains exemplary embodiments, together with features, by way of example with reference to the drawings.

DETAILED DESCRIPTION OF EXEMPLARY EMBODIMENTS

Traditional quality-of-service (QoS) implementation at network equipment is mainly focusing on traffic classification, which usually gives higher priority in the sequence of voice, video, and data. The network edge devices will mark ingress packets into different QoS classes and drop the ingress packets that have the lowest QoS classes marking according to such a predefined policy in the event of network congestion. Unlike exemplary embodiments, the traditional QoS would not differentiate the packets within the same QoS classes and do not provide QoS for peer-to-peer applications. The network device will normally drop the packets randomly or drop the packets based on certain calculated weights to select which packets to drop. Consequently, all the traffic within the same QoS class could be hurt and degraded.

With the increasing popularity of peer-to-peer (P2P) applications, such as P2P television (TV) and phone services, the traditional QoS is becoming insufficient and inflexible to ensure high performance to P2P application users. A peer-to-peer, commonly abbreviated to P2P, is any distributed network architecture composed of participants that make a portion of their resources, such as processing power, disk storage, and/or network bandwidth, directly available to other network participants without the need for central coordination instances such as servers or stable hosts. Peers are both suppliers and consumers of resources which is in contrast to the traditional client-server model where only servers supply, and clients consume. The term P2P TV refers to peer-to-peer (P2P) software applications designed to redistribute video streams in real time on a P2P network, and the distributed video streams are typically TV channels from all over the world but may also come from other sources.

First, traffic generated by these P2P applications looks no different than ordinary data, such that the traditional QoS will not flag the P2P data as high priority. However, in fact, these P2P applications are no less sensitive to the packet loss, network jitter, and delay than voice and video services. Second, despite the fact that these P2P services operate on the customer's own network, the traditional QoS does not allow the customers to tune the network to favor the services of highest importance to them.

The traditional quality-of-service (QoS) is based on the type of Internet connection service and thereby unable to deal with traffic within the same type of Internet connection service. However, the technique of exemplary embodiments is flow-based QoS which associates QoS policies with network flows and allows for a fine-grained control over Internet connection services regardless of their types. Moreover, the flow-based QoS of exemplary embodiments provides the end users with the flexibility of defining their own QoS policy per, e.g., software application transmitting and receiving packets over the network.

Here the "network" can refer to the Internet Service Provider (ISP) and the network equipment owned and/or controlled by the ISP. Even though the user may have a certain contracted quality of service for Internet communications over the ISP's network based on the type of Internet connection such as dial up or cable, exemplary embodiments allow the user, which can also be referred to as the customer, to specify his or her own quality of server for different software applications and data flows within the contracted quality of service. The contracted quality of service that the user has with the ISP may be by a service level agreement (SLA).

FIG. 1 illustrates a block diagram 100 in accordance with exemplary embodiments. The diagram 100 depicts a computer 10a which may be one or more user devices distributed over a network or operatively connected to one or more servers over a network. The computer 10a may be any type of communication device having hardware and software for communicating over a network as understood by one skilled in the art. The computer 10a may include and/or be coupled to memory 15, a communication interface 40, display 45, user interfaces 50, processors 60, and software 20. The communication interface 40 comprises hardware and software for communicating over the network. The user interfaces 50 may include, e.g., a track ball, mouse, pointing device, keyboard, touch screen, etc, for interacting with the computer 10, such as inputting information, making selections, typing text or numbers, inputting commands, and generally interfacing with the computer 10a as understood by one skilled in the art. The processors 60 are for processing computer executable instructions of exemplary embodiments.

The computer 10a includes memory 15 which may be a computer readable storage medium. One or more software applications such as the software tool 20 may reside on or be coupled to the memory 15, and the software tool 20 comprises logic and software components to operate and function in accordance with exemplary embodiments in the form of computer executable instructions. The software tool 20 is configured to implement flow based quality of service (QoS) based on the user's direction according to exemplary embodiments. The software tool 20 may include a graphical user interface (GUI) in which the user can interact with, e.g., to input commands. Although the software tool 20 is shown as a single element in FIG. 1 for conciseness, the software tool 20 may represent numerous software components or modules according to exemplary embodiments.

FIG. 1 may also include computers 10b, 10c, through 10n, which may be similar and/or identical to the computer 10a. The details of computers 10b-10n are not shown for conciseness. The computers 10a-n may represent a plurality of computers, for example, at an office, in a home, in a school, and/or in any environment. The computers 10a-n may be operatively connected to an Internet Service Provider via a gateway 70, which may be a cable modem, digital subscriber line (DSL) modem, a hub, switch, and/or circuit for gaining access to the ISP's network. The gateway 70 may be a physical and/or wireless access point for operatively connecting the computers 10a-n to the network equipment of the ISP. As understood by one skilled in the art an Internet service provider (ISP), also sometimes referred to as an Internet access provider (IAP), is a company that offers its customers access to the Internet. The ISP connects to its customers using a data transmission technology such as the gateway 70 appropriate for delivering the Internet Protocol Paradigm, such as dial-up, DSL, cable modem, wireless or dedicated high-speed interconnects. For customers with more demanding requirements, such as medium-to-large businesses, DSL, Ethernet, Frame Relay, Integrated Services Digital Network (ISDN), Asynchronous Transfer Mode (ATM), satellite Internet access and synchronous optical networking (SONET) may be used via the gateway 70.

The computer 10a includes the software tool 20 that allows the user to define and prioritize traffic flow for different services in a quality of service priority table 110 for transmission and reception across the ISP's network. The different services are represented by services 25. Via the software tool 20, the user creates and displays the quality of service priority table 110 of services 25. The software tool 20 allows the user to input via the user interface 50 a user quality of service level for each of the services 25 in the quality of service priority table 110, and the user specified quality of service levels in the quality of service priority table 110 are in addition to the traditional quality of service contracted with through the ISP. The services 25 may be various software applications and protocols that transmit and receive packets over the ISP's network equipment, and the services 25 may be running on the computers 10a-n. The ISP's managed and controlled network equipment is represented as components 160 and network 165. The gateway 70 may also be the ISP's network equipment and may be located at the customer's premises and/or at the edge of the customer's premises. The components 160 and the network 165 may include circuit-switched and/or packet-switched technologies and devices, such as routers, switches, hubs, gateways, etc., for facilitating communications. The network 165 may include other IP networks. The network 165 may include wireline and/or wireless components utilizing, e.g., IEEE 802.11 standards for providing over-the-air transmissions of communications.

In accordance with exemplary embodiments, the ISP components 160 include one or more servers 130, one or more servers 140, and one or more edge devices 150. The server 130 includes policy management 135 which is a software application that receives and enforces the quality of service priority table 110 for the services 25. The policy management 135 is configured to implement the quality of service priority table 110 for the services 25 as a policy that is enforced at the edge device 150. The edge device 150 may be a router. During network congestion, the policy management 135 causes a routing application 155 of the edge device 150 to route the user network traffic of the services 25 based on the quality of service priority table 110 over the network 165, in addition to the traditional quality of service contracted with the ISP. A flow collector 145, which is a software application of the server 140, is configured to detect and distinguish the different types of user traffic flows that correspond to the different services 25, and the flow collector 145 passes this user traffic flow information to the policy management 135. With the user traffic flow individually determined for each of the services 25, the policy management 135 is configured to identify the user traffic flow and map quality of service levels for the user traffic flow for each of the services 25 based on the user's quality of service priority table 110. The policy management 135 causes the routing application 155 of the edge device 150 to individually prioritize routing user traffic flow over the network 165 for each individually identified user traffic flow based on respective quality of service levels. Suppose the flow collector 145 identifies a first user traffic flow, a second user traffic flow, and a third user traffic flow corresponding to the services 25. From the quality of service priority table 110, the policy management 135 determines that a different level of quality of service should be applied to the first user traffic flow corresponding to a first service of the services 25, the second user traffic flow corresponding to a second service of the services 25, and the third user traffic flow corresponding to a third service of the services 25. For instance, the first user traffic flow has a high quality of service for the first service, the second user traffic flow has a medium quality of service for the second service, and the third user traffic flow has a low quality of service for the third service; as such, the policy management 135 enforces the user quality of service at the edge device 150 for routing the first user traffic flow corresponding to the first service, the second user traffic flow corresponding to the second service, and the third user traffic flow corresponding to the third service. In one scenario, only the first traffic flow may be routed and the second and third traffic flows may be dropped by the edge device 150 and not routed over the network 165. In the above example, the first service may operating on the computer 10a, the second service may be operating on the computer 10b, and the third service may be operating on the computer 10c, and each of the services 25 is competing to transmit and receive user traffic flow over the network 165. Alternatively and/or additionally, the first, second, and third services of the services 25 may be operating on the computer 10a with priorities for quality of service implemented and enforced by the components 160 as defined in the user's quality of service priority table 110.

Although the user may have an overall quality of service contracted with the ISP for communicating over the ISP's components 160 and network 165, the software tool 20 is configured to allow the user to specify individual quality of service for each user flow transmitted and received by the individual services 25 over the components 160 and the network 165. The quality of service priority table 110 is on top of the quality of service contracted with the ISP, e.g., by an SLA. For example, to improve the quality of P2P services of the services 25, exemplary embodiments provide the flow-based quality of service in which P2P communications have been defined with a high quality of service in the quality of service priority table 110 of FIG. 2 by the user via the software tool 20. In addition to specifying services 25 the user may also specify protocols with a particular quality of service level in the quality of service priority table 110 just as services.

Turning to FIG. 2, FIG. 2 illustrates an example quality of service table 110 created by the user utilizing the software tool 20 and displayed on the display 45. In FIG. 2, the P2P communication is a service of the services 25 operating, e.g., on the computer 10a, and the P2P communication service has been designated with the highest quality of service by the user via the software tool 20. P2P TV is a service of the services 25 operating, e.g., on the computer 10b, and the P2P TV service has been designated with medium quality of service via the software tool 20. Also, web browsing, e.g., via a web browser such as Internet Explorer® is a service of the services 25 operating on the computer 10c, and an email application, e.g., via an email client such as Outlook® is a service of the services 25 operating on the computer 10n. Both web browsing and email have been designated with a low quality of service by the user of the software tool 20. Alternatively and/or additionally, each service, such as the P2P communication, P2P TV, web browsing, and email, may be operating, i.e., running, on the computer 10a but have various quality of service levels as displayed in the priority table 110 of FIG. 2. With the software tool 20, the user can also input the exact name of the software application and/or the type of service offered by the software application for the services 25. Also, the software tool 20 is configured to scan the computers 10a-n to determine services 25 that are installed on the computer 10a-n, currently running on the computers 10a-n, currently transmitting/receiving user traffic flow from the computers 10a-n, and/or that have communicated user traffic flow over the gateway 70. Based results from the scan, the software tool 20 is configured to present a list of these services 25 for the user to designate with a quality of service priority for the quality of service priority table 110. Additionally, the flow collector 145 can determine all the user traffic flows previously and currently flowing over the network 165, and list the corresponding services 25 to the user for accepting a priority designation in the quality of service priority table 110. Accordingly, the policy management 135 is configured to translate and prioritize the respective user traffic flows for each of the services 25 based on their ranking in the quality of service priority table 110. The components 160 of the ISP are configured to allocate and enforce the respective quality of service for each service 25, which may include blocking and/or dropping some user traffic flows with medium and/or low quality of service as needed to ensure the high quality of service of the P2P communication, according to the quality of service priority table 110.

With reference to the network 165 shown in FIG. 1, the arrows in the network 165 are representations of the routing priority, e.g., high, medium, and low, enforced by the edge device 150 for each user traffic flow in FIG. 2. For example, the P2P communication traffic flow is represented by the first arrow indicating that the P2P communication user traffic flow has the high quality of service over the network 165 for transmission and reception to and from a computing device 195. For the P2P communication traffic flow, the computer 10a receives and transmits the user traffic flow to the computing device 195 which may be another user computer. The P2P TV traffic flow is represented by the second arrow indicating that P2P TV traffic flow has a medium quality of service when routed over the network 165 to and from a computing device 180. The last two arrows for web user traffic flow and email user traffic flow represent a low quality of service when routed over the network 165 to and from web server 185 and email server 190, respectively.

In the flow-based QoS defined by the user's quality of service priority table 110, the idea is to treat user traffic in terms of flows rather than individual packets as done today. A network flow also referred to as user traffic flow or traffic flow is a logical view of IP traffic and is a string of packets associated with the transport of an identifiable "something" at the application layer such as, e.g., a web page, a document, a file, a film, and/or a stream. With combined information from layers 2-4 and by the flow collector 145 extracting 5 tuples of the IP header information from an IP packet, source and destination IP address, source and destination port number, and the protocol for each packet, the flow collector 145 can identify a string of packets as a traffic flow and build a stateful table to keep track of each traffic flow unidirectionally passing though the network 165. An entry in the stateful table is maintained to identify the string of packets for each service 25 communicating a user traffic flow over the components 160 and the network 165. For explanation purposes, the components 160 are depicted separately from the network 165, but both the components 160 and the network 165 may be generally understood to be the "network" and/or "network equipment" of the ISP company providing Internet connection services to the user(s) of computers 10a-n.

For example, based on previous history in the stateful table stored in the server 140 and/or information at the time of transmission/reception, each individual service of the services 25 may be known in advance by its IP header information from an IP packet, source and destination IP address, source and destination port number, and the protocol for the transmitted/received packets. This information (e.g., 5 tuples) for each service 25 in the quality of service priority table 110 may be stored in the server 140, to be recognized as a traffic flow by the flow collector 145 when the matching packets are communicated back and forth over the edge device 150. The computers 10a-n which may be identified or recognized by their gateway 70 are the source, and the computing devices 180, 185, 190, and 195 are the respective destinations.

The flow collector 145 may be implemented in the network traffic analysis systems of network industry providers, like NetFlow of Cisco®, J-flow of Juniper Networks®, C-flow of Acatel-Lucent®, and SFlow® of Inmon.

Figure 4:
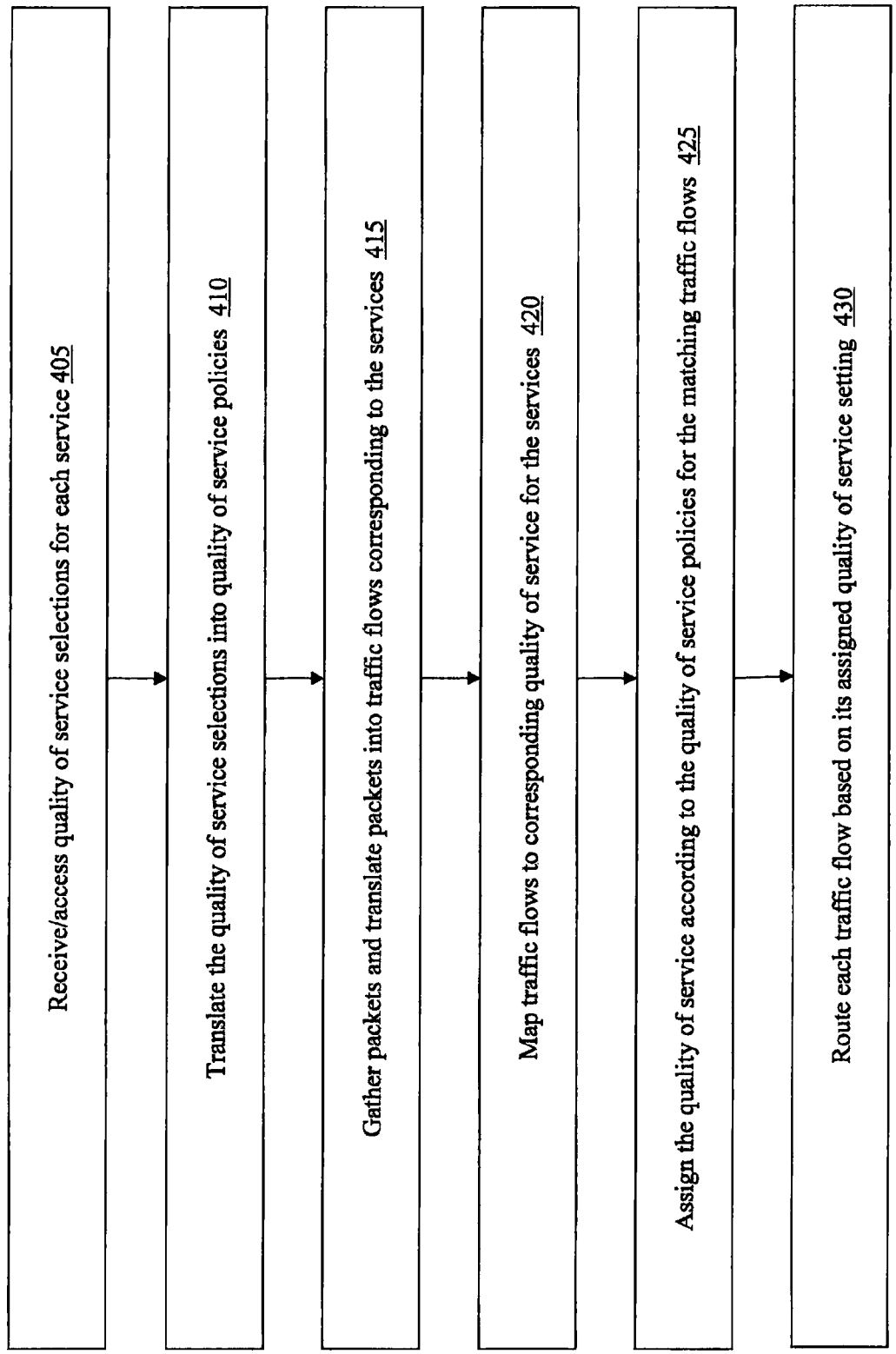
FIG. 4 illustrates a method in accordance with exemplary embodiments.

FIG. 4 illustrates a method 400 in accordance with exemplary embodiments. By utilizing the ISP network infrastructure of the components 160 and the network 165, exemplary embodiments can implement a per traffic flow QoS for the customer, which in this case is the user of computers 10a-n.

At operation 405, the policy management 135 receives/accesses priority for each service 25 in the quality of service priority table 110. The policy management 135 may receive the quality of service priority table 110 from the computer 10a of the user. Although an individual quality of service priority table 110 has been discussed for explanation purposes, it is understood that the policy management 135 receives information from numerous different quality of service priority tables 110 for each of its different ISP customers. The components 160 and network 165 can simultaneously execute the method 400 for the different customers of the ISP, according to exemplary embodiments. Also, the software tool 20 may reside on, e.g., the server 130 and be accessed via a web browser by the user of computers 10a-n to define the priorities of the services 25 of concern. In one scenario, via the quality of service priority table 110, the user may designate that the highest priority is Skype™ which is a P2P communication provider, next YouTube™ streaming, next Internet chatting, and last web browsing. As discussed herein, the flow collector 145 is continuously monitoring all packets passing through the edge device 150, which is a router, to generate the stateful table of the type of traffic flow on the edge device 150. To generate a logical view of the network 165, the flow collector 145 collects information such as the IP header information of the packet, source and destination IP address of the packet, source and destination port number of the packet, and the protocol about the packet on the edge device 150 to produce the traffic flow which is a string of like packets of a particular service 25. As such, each service 25 is defined as a traffic flow by the flow collector 145, so that the correct quality of service can be applied and enforced per traffic flow. The flow collector 145 determines the traffic flow in both directions such as from the computer 10a to the computing device 195 as well as the traffic flow from the computing device 195 to the computer 10a; the flow collector 145 is configured to logically view the traffic flow in both directions as a single traffic flow representing, e.g., P2P communication service of the services 25.

At operation 410, the ISP policy management 135 accepts the user's selections in the quality of service priority table 110, translates them into quality of service policies, and pushes the user's quality of service policies to the edge device 150, which may be multiple edge devices. The ISP may also have other quality of service policies based on its own business needs. In this case, the policy management 135 combines the user's quality of service policies translated from the priority table 110 and the business's quality of service policies to render the final quality of service policy to be enforced at the edge device 150.

At operation 415, the flow collector 145 is configured to gather the user traffic which are packets and translate the packets into traffic flows for the policy management 135. For example, the user traffic flow of a particular service, e.g., the P2P communication, reaches the edge device 150 and gets recognized and identified by the flow collector 145 as P2P communication which is one of the services 25. This recognition and identification occurs for all the services 25 identified in the quality of service priority table 110 to ensure that all traffic flows for the user over the edge device 150 are determined.

At operation 420, the policy management 135 is configured to map the traffic flows determined by the flow collector 145 to their respective quality of service polices. In other words, in a mapping table 500 shown in FIG. 5, the policy management 135 has mapped/matched the user traffic flows determined by the flow collector 145 to their corresponding quality of service levels and services 25 from the quality of service priority table 110. Suppose the P2P communication is the highest priority and/or the only service of the services 25 that is designated with a priority in the quality of service priority table 110, the policy management 135 matches the P2P communication traffic flow to its corresponding quality of service in the user quality of service policy, based on the priority table 110. Likewise, if other services 25 are listed in the priority table 110, the policy management 135 matches these services 25 to their corresponding user traffic flow determined by the flow collector 135 and then to their quality of service level. The policy management 135 passes this mapping configuration information to the routing application 155 of the edge device 150.

At operation 425, the edge device 150 assigns the quality of service level according to the quality of service policies for each of the matching traffic flows. As mentioned above, the quality of service policies are based on the quality of service priority table 110.

At operation 430, the edge device 150 routes the traffic flows matched to each service based on their corresponding assigned quality of service levels of the quality of service policy.

FIG. 5 illustrates an example of the mapping table 500 created and maintained by the policy management 135 in accordance with exemplary embodiments. In the mapping table 500, the policy management 135 maps/matches each traffic flow of packets as determined by the flow collector 145 to the corresponding services 25 and to the corresponding quality of service levels selected for each service of the services 25. The software tool 20 and/or the flow collector 145 is configured to find and determine one or more of the 5 tuples for each service 25 in the quality of service priority table 110, and this information may be displayed (not shown for conciseness) and/or embedded in the quality of service priority table 110.

In FIG. 5, assume that the mapping table 500 is for the user of computers 10a-n who defined quality of service levels in the quality of service priority table 110 illustrated in FIG. 2. Based on the one or more of the 5 tuples which may have been determined in advance and/or determined by the flow collector 145 when monitoring the edge device 150, the flow collector 145 has identified that traffic flows A, B, C, and D respectively match/correspond to services for P2P communication such as Skype™ P2P TV, web browsing such as Internet Explorer®, and email such as Outlook®. The policy management 135 is configured to map each traffic flow A, B, C, and D to its appropriate quality of service level, and the policy management 135 pushes the mapping table 500 information to the edge device 150 to be enforced accordingly. During network 165 congestion, enforcing the user's quality of service levels may cause the edge device 150 to drop traffic flows C and D in order to maintain traffic flows A and B. Also, at times of even more network 165 congestion, the edge device 150 may drop traffic flows B, C, and D in order to maintain traffic flow A that has a high quality of service level.

Now turning to FIG. 3, FIG. 3 illustrates another example of a quality of service priority table 110 in accordance with exemplary embodiments. In FIG. 3, the quality of service priority table 110 depicts an example where the computers 10a-n may represent an office setting of an office environment. Via the software tool 20, a user may be a network administrator who has designated quality of service levels for the services 25 in the quality of service priority table 110. The network administrator may want to ensure that particular services in accordance with the business's operations are properly allocated bandwidth and quality during times of network congestion. In this scenario, office applications directly supporting the business are selected to have a high quality of service. The office applications may represent the fundamental business applications running on the computers 10a-n, which may be legal software applications for a law firm, real estate software applications for a real estate business, engineering applications for a technical business, etc. Email applications may have a medium quality of service via the software tool 20. The network administrator may set a low quality of service for MySpace™ and YouTube™ software applications via the software tool 20 in the quality of service priority table 110, since these software application are not related to business needs in this example. By utilizing the software tool 20, the network administrator can prevent services 25 having a low quality of service priority such as MySpace™ and YouTube™ software applications from affecting essential office applications during times of network congestion over the network 165.

Although the components 160 separately illustrate the server 130, the server 140, and the edge device 150, the functionality including hardware and software of each may be integrated into a single component of the components 160. For example, the functionality of the server 130, the server 140, and the edge device 150 may all be integrated into the edge device 150 according to exemplary embodiments.

Note that although examples are provided for a user(s) of computers 10a-n who define the quality of service priority table 110 for the services 25, exemplary embodiments are configured to enforce many different quality of service priority tables 110 for many different users having their own similar computers 10a-n as discussed herein. The components 160 can recognize, determine, and enforce respective quality of service tables 110 for all users, which are customers of the ISP, having packets simultaneously communicating over the network 165.

Figure 6:
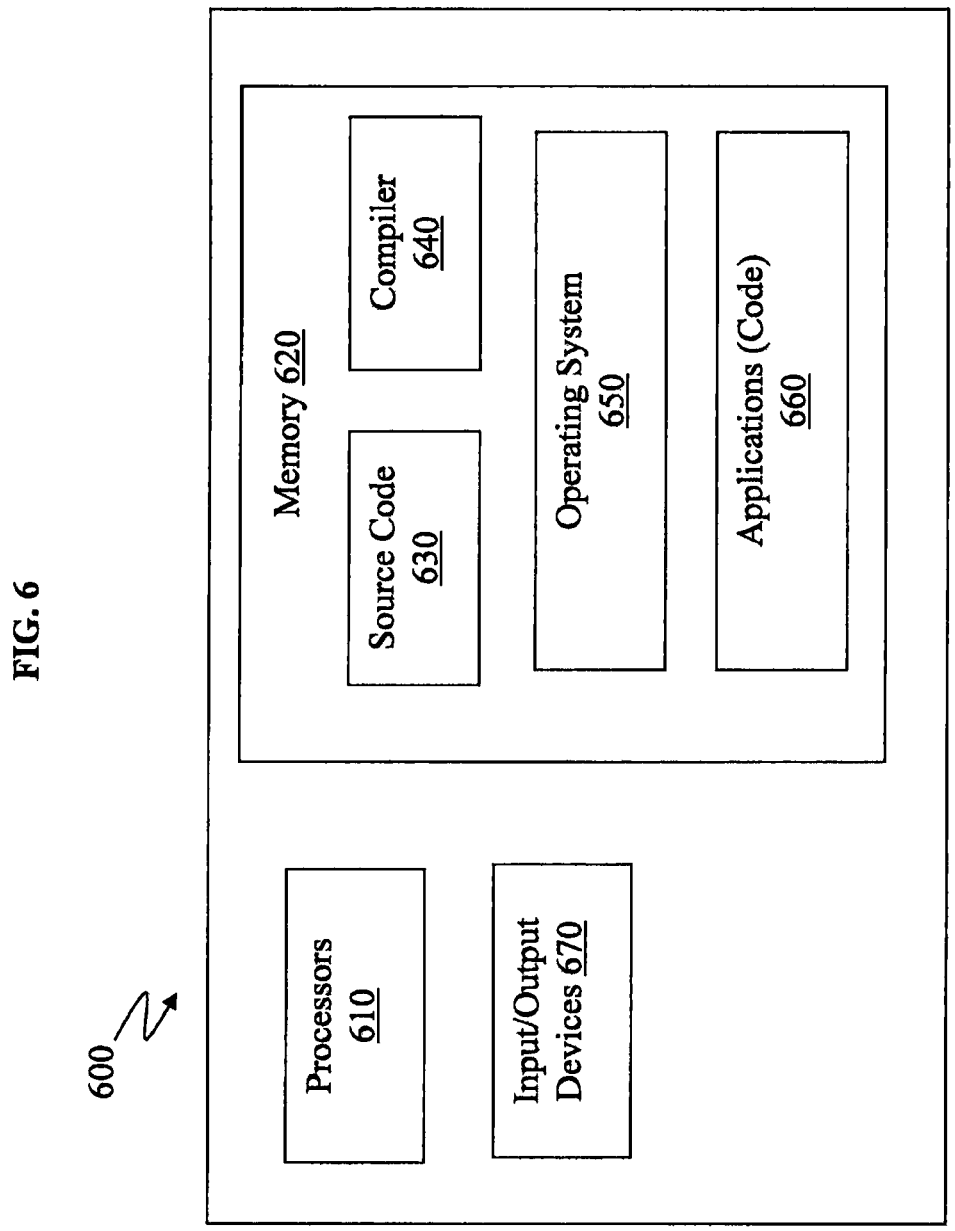
FIG. 6 illustrates a computer having elements utilized in exemplary embodiments.

FIG. 6 illustrates an example of a computer 600 that may be utilized in implementing exemplary embodiments. The computer 600 includes, but is not limited to, PCs, workstations, systems, laptops, PDAs, palm devices, tablets, servers, mobile devices, communication devices, cell phones, computer systems, set top boxes (STB), televisions (TV), game consoles, MP3 players, and the like. Also, any element discussed herein may utilize features of the computer 600. For example, computers 10a-n, components 160, network 165, computing devices 180, 185, 190, and 195 may utilize features of the computer 600.

The computer 600 may include one or more processors 610, memory 620, and one or more input and/or output (I/O) 670 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in computer readable storage memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable storage memory 620 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the computer readable storage memory 620 may incorporate electronic, magnetic, optical, and/or other types of storage media. Note that the computer readable storage memory 620 can have a distributed architecture, where various components are situated remote from one another, but can be accessed by the processor 610.

The software in the computer readable storage memory 620 may include one or more separate programs, each of which comprises an ordered listing of executable instructions for implementing logical functions. In the example illustrated in FIG. 6, the software in the computer readable storage memory 620 includes a suitable operating system (O/S) 650, compiler 640, source code 630, and one or more applications 660 (or Modules) of the exemplary embodiments.

The operating system 650 controls the execution of other computer programs, and provides scheduling, input-output control, file and data management, memory management, and communication control and related services. It is contemplated by the inventors that the application 660 for implementing exemplary embodiments is applicable on all other commercially available operating systems.

The application 660 may be a source program, executable program (object code), script, or any other entity comprising a set of instructions to be performed. When a source program is to be executed, then the program is usually translated via a compiler (such as the compiler 640), assembler, interpreter, or the like, which may or may not be included within the computer readable storage memory 620, so as to operate properly in connection with the O/S 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, remote controller, camera, biometric input device(s), a vibrator device for non-audible alert, etc. Furthermore, the I/O devices 670 may also include output devices, for example but not limited to, a printer, display, speaker, etc. Also, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 include may include modems, gateways, receivers, transmitters, transceivers, etc. for communicating over a communications network.

When the computer 600 is in operation, the processor 610 is configured to execute software stored within the computer readable storage memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software, it should be noted that the application 660 can be stored on virtually any computer readable storage memory for use by or in connection with any computer related system or method. In the context of this document, a computer readable storage memory may be an electronic, magnetic, optical, or other physical device or means that can contain or store a computer program for use by or in connection with a computer related system or method.

The application 660 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable storage medium can be stored, communicated, propagated, or transported for use by or in connection with the instruction execution system, apparatus, or device.

More specific examples (a nonexhaustive list) of the computer-readable storage medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a computer readable storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of traffic flow for a network, the method comprising:

receiving a quality of service priority table for a plurality of services defined by a user at the network, wherein the quality of service priority table includes quality of service levels for the plurality of services;

determining traffic flows to correspond to packets being communicated over the network for the user;

mapping the traffic flows to the plurality of services, the plurality of services respectively corresponding to individual software applications on a computer of the user;

wherein the individual software applications on the computer comprise a peer-to-peer software application, a web browsing software application, an email software application, and a social networking application;

mapping the traffic flows to the quality of service levels for the plurality of services that respectively correspond to the individual software applications on the computer of the user;

assigning the quality of service levels to the traffic flows as assigned quality of service levels corresponding to the plurality of services of the individual software applications on the computer, each of the software applications having its own one of the assigned quality of service levels as defined by the user of the computer; and routing each of the traffic flows, corresponding to the individual software applications on the computer of the user, over the network according to the assigned quality of service levels;

wherein the network comprises network equipment controlled by an internet service provider.

2. The method of claim 1, wherein the network is operative to provide a particular quality of service for the packets of the user communicated over the network based on a service level agreement; and wherein the quality of service priority table for the plurality of services defined by the user is in addition to the particular quality of service based on the service level agreement.

3. The method of claim 1, wherein the plurality of services correspond to software applications of the user which communicate over the network.

4. The method of claim 1, wherein the quality of service priority table allows the user to select the quality of service levels for each of the plurality of services.

5. The method of claim 1, wherein the quality of service levels for the plurality of services comprises a high priority, a medium priority, and a low priority.

6. The method of claim 1, wherein the network is operative to provide a high quality of service for first services of the plurality of services, to provide a medium quality of service for second services of the plurality of services, and to provide a low quality of service for third services.

7. The method of claim 1, wherein determining the traffic flows to correspond to the packets being communicated over the network for the user comprises separately identifying each of the traffic flows as a string of packets having internet protocol header information, having source and destination internet protocol address, having source and destination port number, and having a protocol.

8. A network, operative for traffic flow, the network comprising:
   memory comprising a program; and
   a processor executing computer-executable instructions in the program to perform:
   receiving a quality of service priority table for a plurality of services defined by a user at the network, wherein the quality of service priority table includes quality of service levels for the plurality of services;
   determining traffic flows to correspond to packets being communicated over the network for the user;
   mapping the traffic flows to the plurality of services, the plurality of services respectively corresponding to individual software applications on a computer of the user;
   wherein the individual software applications on the computer comprise a peer-to-peer software application, a web browsing software application, an email software application, and a social networking application;
   mapping the traffic flows to the quality of service levels for the plurality of services that respectively correspond to the individual software applications on the computer of the user;
   assigning the quality of service levels to the traffic flows as assigned quality of service levels corresponding to the plurality of services of the individual software applications on the computer, each of the software applications having its own one of the assigned quality of service levels as defined by the user of the computer; and
   routing each of the traffic flows, corresponding to the individual software applications on the computer of the user, over the network according to the assigned quality of service levels;
   wherein the network comprises network equipment controlled by an internet service provider.

9. The network of claim 8, wherein the processor provides a particular quality of service for the packets of the user communicated over the network based on a service level agreement; and
   wherein the quality of service priority table for the plurality of services defined by the user is in addition to the particular quality of service based on the service level agreement.

10. The network of claim 8, wherein the plurality of services correspond to software applications of the user which communicate over the network.

11. The network of claim 8, wherein the quality of service priority table allows the user to select the quality of service levels for each of the plurality of services.

12. The network of claim 8, wherein the quality of service levels for the plurality of services comprises a high priority, a medium priority, and a low priority.

13. The network of claim 8, wherein the processor is operative to provide a high quality of service for first services of the plurality of services, to provide a medium quality of service for second services of the plurality of services, and to provide a low quality of service for third services.

14. The network of claim 8, wherein determining traffic flows to correspond to the packets being communicated over the network for the user comprises separately identifying each of the traffic flows as a string of packets having internet protocol header information, having source and destination internet protocol address, having source and destination port number, and having a protocol.

15. The network of claim 8, wherein the quality of service priority table for the plurality of services of the user is stored in the memory.

16. The network of claim 8, wherein a mapping table is stored in the memory; and
   wherein the mapping table comprises a correlation among the traffic flows, the plurality of services, and the quality of service levels for the plurality of services.

17. A computer program product, embodied on a non-transitory computer readable storage medium, the computer program product including instructions for causing a computer to execute a method of traffic flow for a network, the method comprising:
   receiving a quality of service priority table for a plurality of services defined by a user at the network, wherein the quality of service priority table includes quality of service levels for the plurality of services;
   determining traffic flows to correspond to packets being communicated over the network for the user;
   mapping the traffic flows to the plurality of services, the plurality of services respectively corresponding to individual software applications on the computer of the user;
   wherein the individual software applications on the computer comprise a peer-to-peer software application, a web browsing software application, an email software application, and a social networking application;
   mapping the traffic flows to the quality of service levels for the plurality of services that respectively correspond to the individual software applications on the computer of the user;
   assigning the quality of service levels to the traffic flows as assigned quality of service levels corresponding to the plurality of services of the individual software applications on the computer, each of the software applications having its own one of the assigned quality of service levels as defined by the user of the computer; and
   routing each of the traffic flows, corresponding to the individual software applications on the computer of the user, over the network according to the assigned quality of service levels;
   wherein the network comprises network equipment controlled by an internet service provider.

18. The computer program product of claim 17, wherein the network is operative to provide a particular quality of service for the packets of the user communicated over the network based on a service level agreement; and wherein the quality of service priority table for the plurality of services defined by the user is in addition to the particular quality of service based on the service level agreement.

19. The computer program product of claim 17, wherein the plurality of services correspond to software applications of the user which communicate over the network.

20. The computer program product of claim 17, wherein the quality of service priority table allows the user to select the quality of service levels for each of the plurality of services.

* * * * *